(12) United States Patent
Suri

(10) Patent No.: US 10,122,249 B2
(45) Date of Patent: Nov. 6, 2018

(54) SYSTEM FOR GENERATION OF ELECTRICITY

(71) Applicant: Vikrant Suri, Mohali (IN)

(72) Inventor: Vikrant Suri, Mohali (IN)

( * ) Notice: Subject to any disclaimer, the term of this patent is extended or adjusted under 35 U.S.C. 154(b) by 0 days.

(21) Appl. No.: 15/331,476

(22) Filed: Oct. 21, 2016

(65) Prior Publication Data

US 2018/0069461 A1 Mar. 8, 2018

(30) Foreign Application Priority Data

Sep. 5, 2016 (IN) .............................. 201611030288

(51) Int. Cl.
| | |
|---|---|
| H02K 1/00 | (2006.01) |
| H02K 35/02 | (2006.01) |
| F03G 5/06 | (2006.01) |
| H02K 1/12 | (2006.01) |
| H02K 1/34 | (2006.01) |
| H02K 7/18 | (2006.01) |

(52) U.S. Cl.
CPC .............. *H02K 35/02* (2013.01); *F03G 5/06* (2013.01); *H02K 1/12* (2013.01); *H02K 1/34* (2013.01); *H02K 7/1876* (2013.01)

(58) Field of Classification Search
CPC . H02K 35/02; H02K 1/12; H02K 1/34; F03G 5/06
USPC .................... 290/1 R; 60/398, 698, 495, 497
See application file for complete search history.

(56) References Cited

U.S. PATENT DOCUMENTS

| | | | | |
|---|---|---|---|---|
| 685,269 | A * | 10/1901 | Fulton ..................... | F01B 17/02 185/33 |
| 891,208 | A * | 6/1908 | Craig ..................... | F02G 1/0535 187/274 |
| 2,470,312 | A * | 5/1949 | Levin ........................ | F04F 1/06 60/496 |
| 2,537,143 | A * | 1/1951 | Levin ........................ | F04F 1/06 417/337 |
| 4,399,368 | A * | 8/1983 | Bucknam ................ | F02B 71/04 105/29.1 |
| 4,674,281 | A * | 6/1987 | Kim ....................... | F03B 17/025 60/496 |
| 5,584,179 | A * | 12/1996 | Isa .......................... | F04B 9/133 417/122 |
| 7,323,790 | B2 * | 1/2008 | Taylor ................. | F03B 13/1895 290/42 |
| 9,356,489 | B1 * | 5/2016 | Saavedra .................. | F03G 3/00 |
| 2011/0156407 | A1 * | 6/2011 | Dorozenski ............. | F03B 17/02 290/1 R |

(Continued)

*Primary Examiner* — Julio Gonzalez
(74) *Attorney, Agent, or Firm* — Ladas & Parry, LLP

(57) ABSTRACT

The invention provides a system to generate alternate energy. More specifically, it provides for generation of electricity using the principle of buoyancy. The system consists of an outer container on which coils are configured and an internal container on which magnets are configured. The electricity is generated by the movement of magnets with respect to the coil. The movement of magnets is achieved by upward and downward motion of the internal container. The system encompassed by the present invention is cost effective and efficient since the installation cost, running cost and maintenance cost incurred therein is comparatively low. It does not require any fuel consumption for its working and is technically and scientifically very sound in its orientation.

16 Claims, 7 Drawing Sheets

(56) References Cited

U.S. PATENT DOCUMENTS

2012/0117957 A1* 5/2012 Travis ................... F15B 3/00 60/325
2015/0068199 A1* 3/2015 Travis ................... F15B 3/00 60/413

* cited by examiner

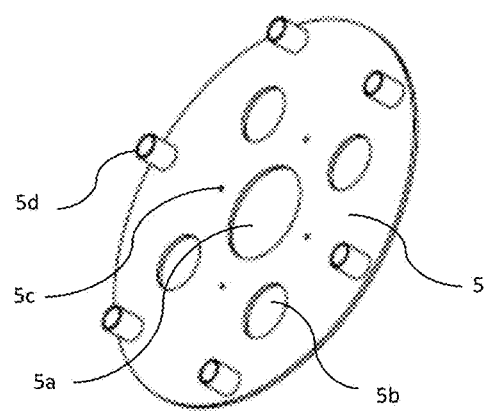
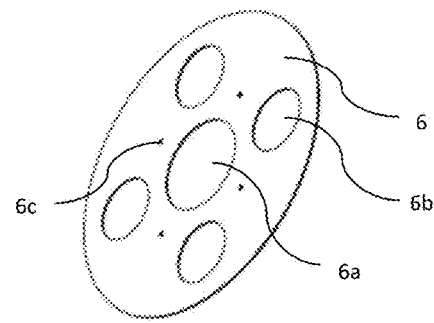
FIG. 4            FIG. 5
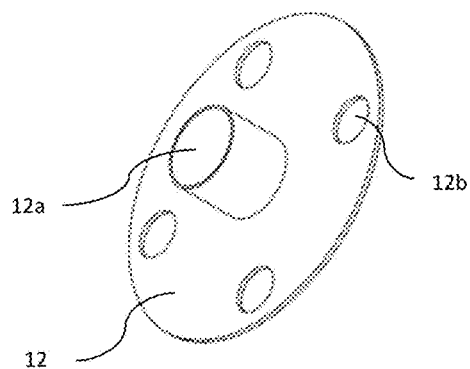
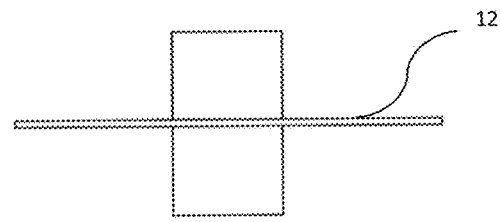
FIG. 6a            FIG. 6b

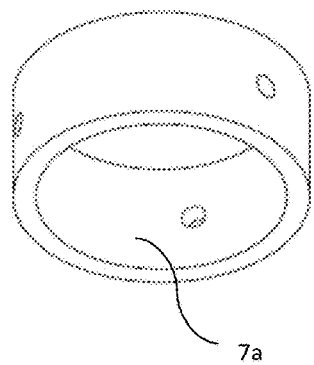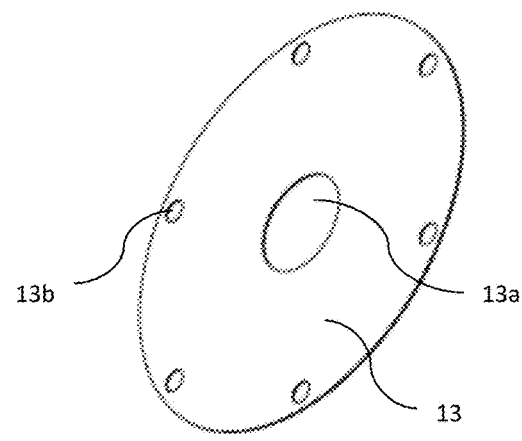
FIG. 7
FIG. 8

| S.No. | Volume of air in inverted container (in liters) | Amount of upward force experienced in the inverted container (in kgf) |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |

FIG. 9

SYSTEM FOR GENERATION OF ELECTRICITY

CROSS-REFERENCE TO RELATED APPLICATION

This application claims priority to Indian Patent Application No. 201611030288 filed on Sep. 5, 2016, the disclosure of which is hereby incorporated by reference in its entirety.

FIELD OF INVENTION

The present invention relates to a system for generation of electricity. Particularly, the present invention relates to a system for generation of electricity using compressed air.

BACKGROUND OF THE INVENTION

The energy demand has been increasing rapidly with growing industrialization and globalization. Most of these demands are met by burning fossil fuels. Fossil fuels are used in thermal power plants to meet majority of electricity requirement. These fuels are limited in quantity and are contributing to environmental pollution and degradation. Therefore, an alternate source of clean and renewable source of energy is the need of the hour.

Human energy is one of the most widely available sources of energy which has been used in certain inventions such as mechanically powered flashlight, hybrid, battery/hand crank radio, lift weight gear operated source of light, pedal power transmitter. However, till date human energy has not been exploited optimally in generating electricity and also, suitable systems have not been developed which can convert human energy directly into electricity. Some existing systems to convert human energy to electricity are mainly in the field of human kinetic energy, wherein pedal power is directly converted to electricity via a dynamo.

Similarly, natural resources like air and water are available in plenty. Water has been utilized to generate electricity in hydroelectric power plants where the potential energy of water is utilized and converted into electricity. But air has not been effectively utilized for the same till now. Similar to potential energy of water, air pressure can also be utilized to generate electricity.

Therefore, to meet the increasing demand of electricity, there exists a need to generate electricity from natural/human resources.

Considerations

A consideration of the present invention is to provide a system for generation of electricity.

Another consideration of the present invention is to provide a system that utilizes air under pressure for generation of electricity.

Another consideration of the present invention is to provide a system that utilizes human power or automated source to compress air.

Another consideration of the present invention is to provide a system that uses low pressure air to move a magnet with respect to a coil to generate electricity.

Another consideration of the present invention is to provide a system that is easy to install, low in maintenance and environmental friendly.

SUMMARY OF THE INVENTION

The present invention relates to a system for generation of electricity using air under pressure. The system encompassed by the present invention comprises electricity generating unit which uses the principle of buoyancy and hydrostatic pressure means to move magnet/s relative to coil/s made up of electricity conducting wire.

Accordingly, the present invention relates to a system for generation of electricity, wherein the system comprises an outer container which further comprises an outer set of tubes and an inner set of tubes, arranged circumferentially on the outer and inner side of said container wall. The system further comprises at least one coil held in between a horizontal plate and a metallic sheet which in turn is supported by the outer set of tubes of the outer container. It further comprises an inverted internal container which in turn comprises an air inlet means configured at the bottom of the outer container for injecting low pressure air into the lower end of the inverted internal container. Also part of the system is a movable shaft configured on the top of the inverted internal container and at least one pair of magnets configured towards the proximal/distal end of the shaft. The outer container is partially filled with a fluid in which floats the inverted internal container which in turn is adapted to move in vertical direction upon injection of low pressure air into the bottom of the inverted internal container, thereby resulting in relative movement of the magnet/s with respect to the coil/s and generating electricity.

In an embodiment of the invention, the inner set of tubes comprises at least two metal tubes affixed circumferentially at equal spaces on the inner wall of the outer container for guiding the inverted internal container.

In another embodiment of the invention, the outer set of tubes comprises at least two metal tubes affixed circumferentially at equal spaces on the outer wall of the outer container for supporting the horizontal plate/s, the coil/s and the metallic sheet/s.

In still another embodiment of the invention, the inner set of tubes and the outer set of tubes are made up of any non-magnetic metal or alloy, preferably steel.

In yet another embodiment of the invention, the fluid consists of any fluid of density greater than 1 $g/cm^3$ preferably water, saline water, oil, glycerin or combination thereof.

In still another embodiment of the invention, the inverted internal container is partially sealed using metal sheet.

In yet another embodiment of the invention, the central shaft being placed on the top of the inverted internal container is held in place by means of a collar.

In still another embodiment of the invention, the outer container and the inverted internal container is made up of any non-magnetic metal or alloy preferably steel.

In yet another embodiment of the invention, the magnets are placed on the either side of a non-magnetic disc which is held on the shaft which in turn is affixed on the inverted internal container.

In still another embodiment of the invention, the shaft and the non-magnetic disc are made up of any non-magnetic metal or alloy preferably aluminium.

In yet another embodiment of the invention, the weights of inverted internal container including the central shaft, magnets, and non-magnetic discs are configured in such a way that it balances the buoyancy force from water.

In still another embodiment of the invention, the coil/s are placed on a horizontal plate held firmly in place by means of the metal sheet having holes coinciding with the orifices of the coils.

In yet another embodiment of the invention, the coil is made up of a wire made up of any electrical conductive material.

In still another embodiment of the invention, it uses manual or automated means to compress air for the generation of electricity.

In yet another embodiment of the invention, the pressure at which the air is injected into the system is at least 1.5 psi.

BRIEF DESCRIPTION OF DRAWINGS

FIG. 1b is an enlarged view of a portion of the system shown in FIG. 1a.

FIG. 4 illustrates the isometric view of the horizontal plate of the system for generation of electricity in accordance with example embodiments of the present invention.

FIG. 5 illustrates the isometric view of the metallic sheet of the system for generation of electricity in accordance with example embodiments of the present invention.

FIG. 6a illustrates the isometric view of the non-magnetic disc of the system for generation of electricity in accordance with example embodiments of the present invention.

FIG. 6b illustrates the front view of the non-magnetic disc of the system for generation of electricity in accordance with example embodiments of the present invention.

FIG. 7 illustrates the isometric view of the collar of the system for generation of electricity in accordance with example embodiments of the present invention.

FIG. 8 illustrates the isometric view of the covering plate of the system for generation of electricity in accordance with example embodiments of the present invention.

FIG. 9 illustrates a table showing relation between volume of air in inverted container and amount of force experienced in the inverted container in accordance with example embodiments of the present invention.

DETAILED DESCRIPTION OF THE INVENTION

The present invention provides a system to generate alternate energy. More specifically, it provides a system for generation of electricity from human energy. The system encompassed by the present invention is cost effective and efficient since the installation cost, running cost and maintenance cost incurred therein is comparatively low. The system does not require any fuel consumption for its working and is technically and scientifically very sound in its orientation.

The present invention, in particular, relates to an electricity generating unit which exclusively uses manual or automatic means to compress air, which is used to move magnet/s through coil/s. This is achieved by low pressure air overlaid by the principle of buoyancy of water. The invention is the fabrication of an apparatus using scientific methodology of the principle of buoyancy, hydrostatic force and gravity to generate electricity, by means of low pressure air.

Figure 1A:
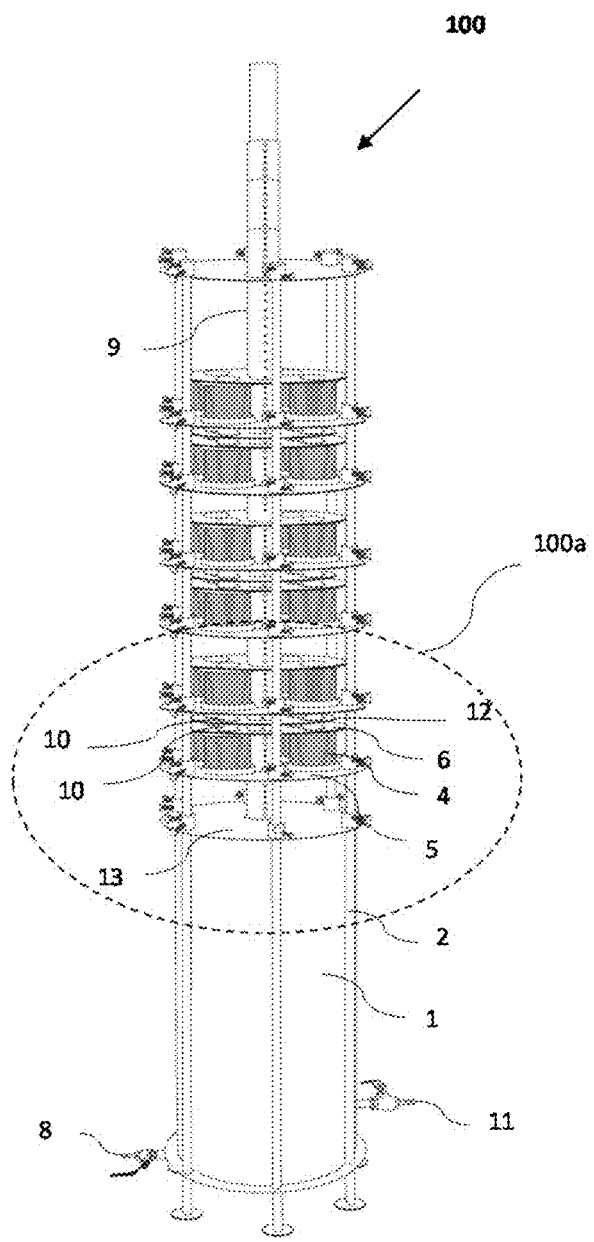
FIG. 1a illustrates the isometric view of the system for generation of electricity in accordance with example embodiments of the present invention.

FIG. 1a illustrates the isometric view of the system of the present invention. The system (100) comprises an outer container (1) comprising an outer set of tubes (2) and an inner set of tubes (3) arranged circumferentially on the outer and the inner side of said container. The outer container is filled with a fluid of density greater than 1 g/cm$^3$. In a preferred embodiment of the invention the fluid is water, saline water, oil, glycerin or combination thereof. An inlet/outlet (11) for fluid is provided at the bottom of the outer container (1). Further the system comprises of an inverted internal container (7) placed inside the outer container (1). The internal container (7) further comprises of a shaft (9) configured on the top surface of the internal container (7). At least one pair of magnets (10) is configured on the non-magnetic disc (12), which is affixed to the shaft (9). The vertical movement of the internal container (7) enables the magnets (10) to move vertically. Coil/s (4) is placed between a horizontal plate (5) and a metallic sheet (6). The assembly of coil/s (4) along with horizontal plate (5) and the metallic sheet (6) is affixed on the outer set of tubes (2). Further low pressure air is injected into the internal container (7) by an air inlet means (8) configured at the bottom of the outer container (1). In an embodiment of the present invention, foot air pump is used to pump compressed air into a cylinder and this compressed air is used to move the internal container (7) and thus generate electricity.

Figures 2A, 2B:
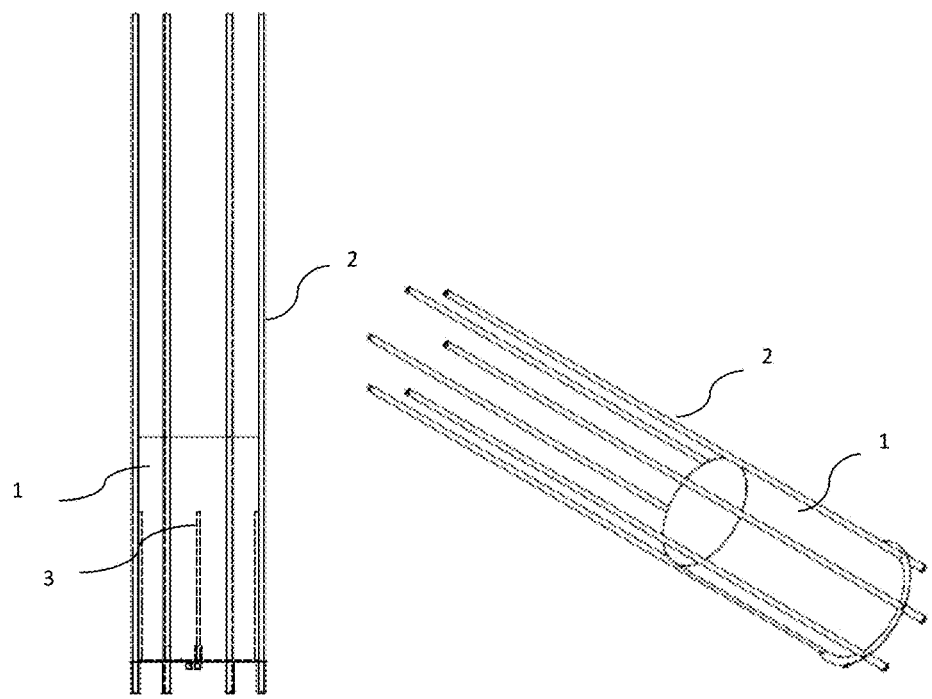
FIG. 2a illustrates the front view of the outer container of the system for generation of electricity in accordance with example embodiments of the present invention.
FIG. 2b illustrates the isometric view of the outer container of the system for generation of electricity in accordance with example embodiments of the present invention.

FIGS. 2(a) and 2(b) illustrates the isometric and front view of the outer container (1). The outer container (1) is made up of a non-magnetic metal or alloy, preferably steel, or alternatively aluminium, copper, zinc, magnesium, brass and tin. The container (1) comprises at least 2 tubes forming inner set of tubes (3), welded equiangular on the inside wall of the container to guide the mobile internal container (7) within. The outer container (1) further comprises at least 2 tubes forming outer set of tubes (2) having thick wall, welded equiangular on the outside wall of the container. The outer set of tubes (2) acts as pillars on which the electricity generating components are set up. In a preferred embodiment of the present invention, the inner set of tubes (3) consists of 4 tubes and the outer set of tubes (2) consists of 6 tubes. However, it will be appreciated by a person skilled in the art that the number of tubes may vary and such a modification is encompassed by this disclosure.

Figure 3A:
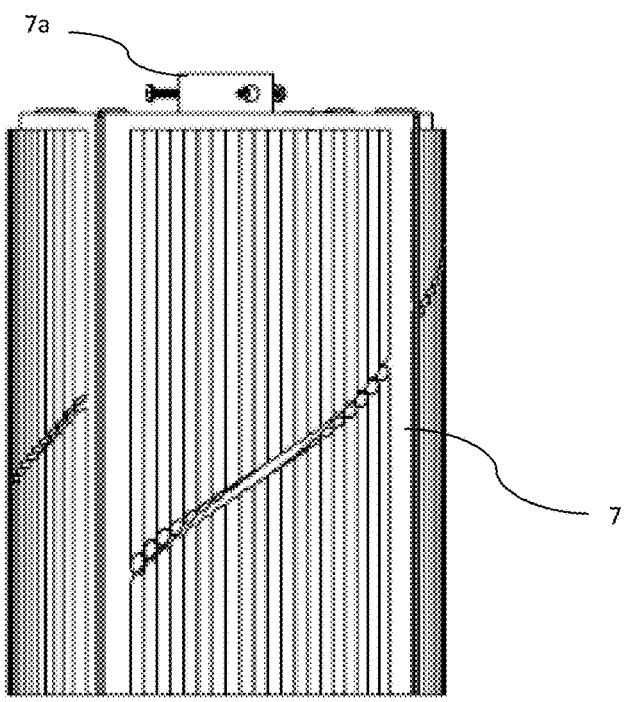
FIG. 3a illustrates the front view of the internal container of the system for generation of electricity in accordance with example embodiments of the present invention.
Figure 3B:
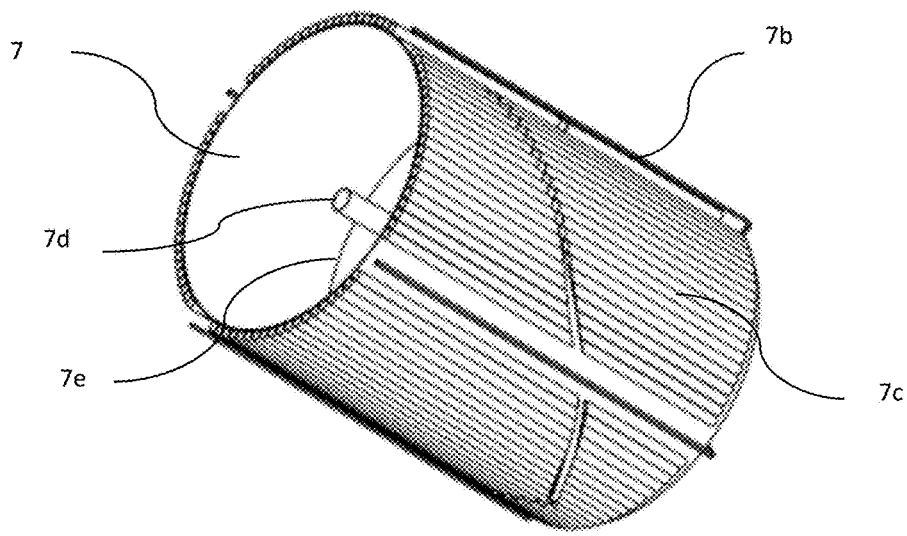
FIG. 3b illustrates the isometric view of the internal container of the system for generation of electricity in accordance with example embodiments of the present invention.

FIGS. 3(a) and 3(b) illustrates the isometric and front view of the internal container (7). The internal container (7) is fabricated of such size as having a clearance fit on the inside of the outer container (1). The internal container (7) is made up of non-magnetic metal or alloy preferably steel, or alternatively aluminium, copper, zinc, magnesium, brass and tin. The internal container (7) is partially sealed with a round metal sheet (7e), wherein the metal sheet (7e) is made up of non-magnetic metal or alloy preferably stainless steel or alternatively aluminium, copper, zinc, magnesium, brass and tin. Further, the outside wall of the internal container (7) is covered with pipes (7c), placed adjacent to each other having small spacing preferably ½ inch along the length at various intervals in a helical setting to allow free flow movement of water, while at the same time lessening/reducing drag or resistance of water. The pipes (7c) reduce drag and friction and therefore aids in the working of the invention.

A set of rods (7b) are configured/provided on the outer wall of the internal container (7), wherein the number of said rods (7b) of internal container (7) depends on the number of inner set of tubes (3) of outer container (1). The internal container (7) is settled into the cavity of outer container (1), guided in place by means of said set of rods (7b) which were put inside the inner set of tubes (3) of the outer container (1). In a preferred embodiment of the present invention, the number of said rods (7b) of internal container (7) is double the number of tubes of inner set of tubes (3) of outer container (1). The set of rods (7b) are made up of non-magnetic metal or alloy preferably stainless steel, or alternatively aluminium, copper, zinc, magnesium, brass and tin.

A collar (7a) as shown in FIG. 3a, is affixed on the top side of the internal container (7), wherein the collar (7a) is made up of non-magnetic metal or alloy, preferably stainless steel or alternatively aluminium, copper, zinc, magnesium, brass and tin. A shaft (9) is then placed on top of internal container (7) and held in place by means of the collar (7a). The shaft (9) is made up of non-magnetic metal or alloy preferably aluminum or alternatively stainless steel, copper, zinc, magnesium, brass and tin. The internal container (7) consists of a pipe (7d) configured at the bottom center for air inlet. At the lower end of the outer container (1), an inlet (8) is configured by using a stainless steel pipe, whose outer end has an inlet nozzle and inner end is welded at the precise center underneath the outer container (1). The inlet (8) is used to feed low pressure air into the inside of internal container (7) to run the invention. An outlet (11) is created from the bottom side of outer container (1) which is used for filing/draining out the water from the outer container (1).

A stainless steel plate (13) (also shown in FIG. 8) is placed as a cover to both the internal container (7) and outer container (1) to prevent dust and other particles from falling inside as also to prevent splashing of fluid outwards. The stainless steel plate (13) comprises a hole (13a) for the movement of the shaft (9) and holes (13b) which allows the outer set of tubes (2) to move freely.

FIGS. 4 and 5 illustrate the isometric view of the horizontal plate (5) and metal sheet (6) respectively.

The horizontal plate (5) has at least one coil (4) placed thereon, wherein said coil is held firmly in place by means of the metal sheet (6) having holes coinciding with the orifices of the coils (4). The horizontal plate (5) and the metal sheet (6) have holes (5a) and (6a) respectively in the center for the shaft (9) to pass through; and holes (5b) and (6b) respectively coinciding with the orifices of the respective coils. Further the horizontal plate (5) and the metal sheet (6) have holes (5c) and (6c) respectively to affix the coil (4) between them. A set of bushes (5d) are configured on the sides of the horizontal plate (5) such that the bushes (5d) can freely move when they are mounted one on each of the outer set of tubes (2). The said horizontal plate (5) and metal sheet (6) are made up of non-magnetic metal or alloy preferably stainless steel or alternatively aluminium, copper, zinc, magnesium, brass and tin. The coils (4) are made up of good conductor metal wires preferably copper, aluminum, cadmium-copper alloys, phosphor bronze, galvanized steel, steel core copper and steel core aluminium. In an exemplary embodiment, thin enameled, high quality Copper of 0.193 mm otherwise known as Standard wire gauge No 36 (British Standard Gauge) can be used.

The coils are configured in such a manner that on passing the North pole of a magnet through the orifice of the coil, the induced positive (+) and negative (−) terminals of the coil are identified as the two ends of wire in the coil and are so marked. Likewise, the induced voltage is set in same phase in all coils. In a preferred embodiment of the present invention, 4 coils are held between the horizontal plate (5) and metal sheet (6). Each coil is further divided into a number of sub-coils, preferably 15.

Figure 1B:
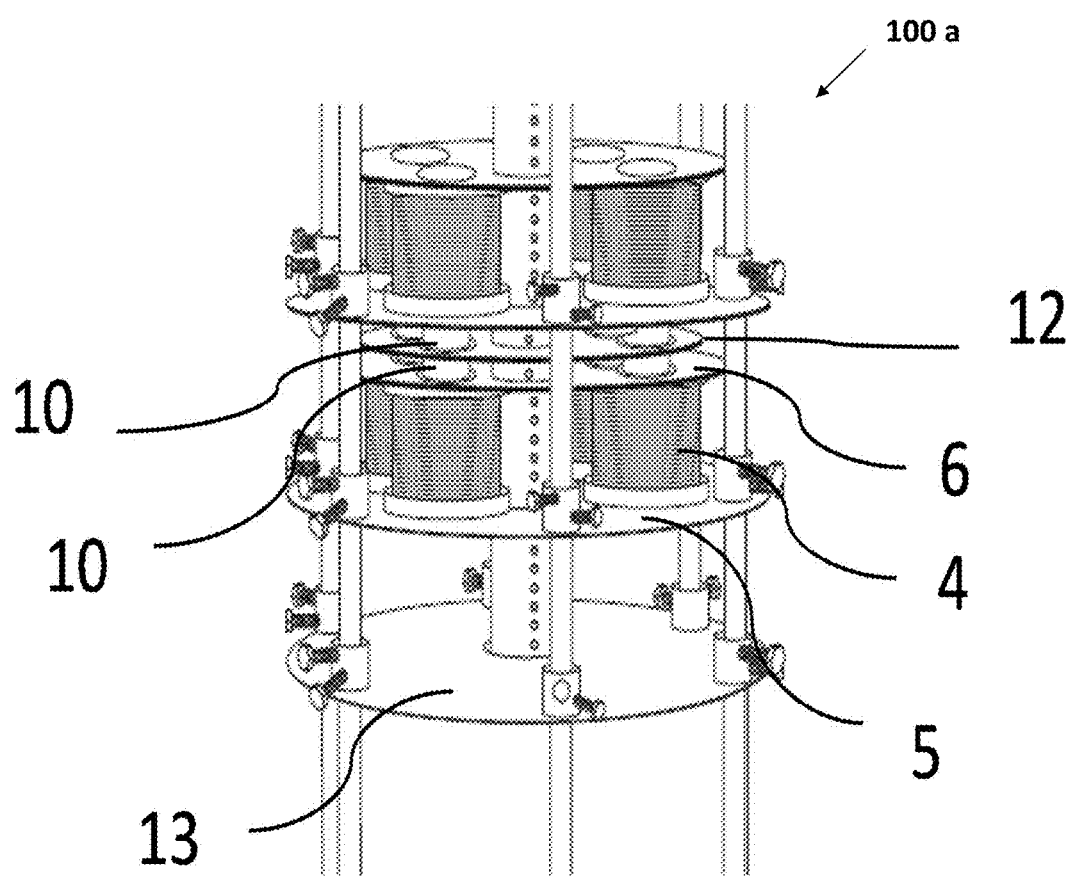

FIGS. 6a and 6b illustrate the isometric and front view of the non-magnetic disc. The non-magnetic disc (12) is affixed on shaft (9) in such a manner that both the disc (12) and the shaft (9) move vertically in unison. The non-magnetic disc (12) comprises a central hole (12a) for fixing the said non-magnetic disc (12) on the shaft (9). The disc (12) is configured to hold the magnets (10). The magnets (10) are configured on either side of the disc (12) such that the holding strength is provided by the magnets themselves, as shown in FIG. 1b. The magnets (10) are placed at the troughs (12b) on the non-magnetic disc (12), wherein the troughs (12b) coincide with the orifice of the coils (4). The positioning and alignment, horizontally and vertically of the magnets (10) within the coils (4) is done manually and by use of multi-meter, such as to give optimum/maximum generation of electricity. The magnets used in the present invention are super-magnets of magnetic strength 3000 Gauss or more and may be preferably 5700 Gauss. However it will be appreciated by a person skilled in the art that the magnetic strength of the magnets may differ based on the size and number of the coils, and the same is encompassed by this disclosure.

In a preferred embodiment of the present invention, one super-magnet is placed above and two super-magnets are placed below the non-magnetic disc (12) and such arrangement of super-magnets are configured with respect to the orifice of the coils.

In a preferred embodiment of the present invention, one more configuration of coils (4) with horizontal plate (5) and metal sheet (6) is placed above the configuration of non-magnetic disc (12) and the magnets (10). This arrangement of coils above and below the non-magnetic disc (12) allows the generation of electricity in both top and bottom set of coils, since magnets are attached on both sides of the non-magnetic disc (12).

In an embodiment of the present invention, multiple levels of magnets and coils can be configured to generate electricity as per need.

Working

The working of the system for generation of electricity in accordance with example embodiments of the invention is explained in the following paragraphs. The outer container (1) is filled with a fluid to a particular level which leads to the rise in internal container (7) due to the buoyancy of said fluid. In an embodiment, the fluid contained in the outer container (1) is water. The rise is controlled by weights of the internal container (7), magnets (10), central Shaft (9), non-magnetic disc (12) and nuts and bolts. The weights are configured in such a way that it balances the buoyancy force of fluid. Thereafter, low pressure air, minimum of 1.5 psi is fed from an external source at the bottom center of the internal container (7) through an opening already created at the bottom center of the outer container (1). This gives an upward movement (rise) to the internal container (7) and therefore also to the central shaft (9) affixed onto the internal container (7). Thus, the magnets as affixed on the non-magnetic disc (12) also gains upward movement and subsequent downward movement. This upward movement and subsequent downward movement of the magnets on passing through the coils generate electricity.

The invention runs on the upward thrust created in an inverted container by low pressure air injected in it, while the inverted container is so inverted in water in another upward facing container. The upward force is obtained in totality and is therefore lessened by the weight of the inverted container and the weights added to the inverted container itself.

A chart showing the upward force generated in the inverted internal container (7) in water and containing air is depicted by FIG. 9. The relationship between the volume and the upward force is for pure water having density of 1000 kg/m³.

The rise and fall of the central shaft (9) is determined by the point at which the magnets most effectively break the induced magnetism of the coils without striking with the horizontal plate (5) or metallic sheet (6).

The fall of the internal container (7) is caused by injecting more air into the internal container (7). Since the internal container (7) has a fixed volume, the air has to find an escape route to move outward. Injection of more air into the internal container (7) gives rise to the release of air bubbles underneath the internal container (7) which brings about a considerable fall of the internal container (7)

The system encompassed by the present invention is cost effective and efficient since the installation cost, running cost and maintenance cost incurred therein is comparatively low.

It does not require any fuel consumption and no chemical reaction takes place for its working and thus is environmental friendly.

While this invention has been particularly shown and described with references to example embodiments thereof, it will be understood by those skilled in the art that various changes in form and details may be made therein without departing from the scope of the invention encompassed by the appended claims.

I claim:

1. A system for generation of electricity, comprising:
   an outer container comprising an outer set of tubes and an inner set of tubes, arranged circumferentially on the outer and inner side of said container wall;
   at least one coil assembly comprising at least one coil held in between a horizontal plate and a metallic sheet, wherein the coil assembly mounted on the outer set of tubes of the outer container, and the at least one coil is placed on a horizontal plate held firmly in place by means of the metallic sheet having holes coinciding with orifices of the at least one coil;
   an inverted internal container comprising
      an air inlet means configured at the bottom of the outer container for injecting low pressure air into the lower end of the inverted internal container,
      a central shaft configured on the top of the inverted internal container,
         at least one pair of magnet configured on a non-magnetic disc, wherein the non-magnetic disc is affixed to the central shaft of the inverted internal container,
   wherein,
      the outer container being partially filled with a fluid in which floats the inverted internal container which in turn is adapted to move in a vertical direction upon injection of low pressure air into the bottom of the inverted internal container, thereby resulting in relative movement of the at least one pair of magnet with respect to the at least one coil and generating electricity.

2. The system as claimed in claim 1, wherein the inner set of tubes comprises at least two metal tubes affixed circumferentially at equal spaces on the inner wall of the outer container for guiding the inverted internal container.

3. The system as claimed in claim 1, wherein the outer set of tubes comprises at least two metal tubes affixed circumferentially at equal spaces on the outer wall of the outer container for supporting the at least one coil assembly.

4. The system as claimed in claim 1, wherein the inner set of tubes and the outer set of tubes are made up of any non-magnetic metal or alloy.

5. The system as claimed in claim 4, wherein the inner set of tubes and the outer set of tubes are made up of steel.

6. The system as claimed in claim 1, wherein the fluid comprises one of water, saline water, oil, glycerin or combination of any fluid of density greater than 1 g/cm³.

7. The system as claimed in claim 1, wherein the inverted internal container is partially sealed using a metal sheet for adjusting volume available inside the inverted internal container.

8. The system as claimed in claim 1, wherein the central shaft being placed on the top of the inverted internal container is held in place by means of a collar.

9. The system as claimed in claim 1, wherein the outer container and the inverted internal container is made up of any non-magnetic metal or alloy.

10. The system as claimed in claim 9, wherein the outer container and the inverted internal container is made up of steel.

11. The system as claimed in claim 1, wherein the at least one magnets is placed on either side of the non-magnetic disc, wherein the magnets are held in place by magnetic strength of the magnets.

12. The system as claimed in claim 1, wherein the central shaft and the non-magnetic disc are made up of aluminium or any non-magnetic metal or alloy.

13. The system as claimed in claim 1, wherein weights of inverted internal container including the central shaft, the at least one pair of magnets, the non-magnetic discs are configured in such a way that the weights balances the buoyancy force from water.

14. The system as claimed in claim 1, wherein the at least one coil is made up of a wire made up of any electrical conductive material.

15. The system as claimed in claim 1, wherein the system it uses manual or automated means to compress air for the generation of electricity.

16. The system as claimed in claim 1, wherein the pressure at which the air is injected into the system is at least 1.5 psi.

* * * * *